United States Patent

Nitta et al.

[11] Patent Number: 5,640,391
[45] Date of Patent: Jun. 17, 1997

[54] RELOCATION CONTROL OF SUBSTRATE CHANNELS

[75] Inventors: Toshio Nitta; Masahiko Yahagi, both of Tokyo, Japan

[73] Assignee: NEC Corporation, Tokyo, Japan

[21] Appl. No.: 338,099

[22] Filed: Nov. 9, 1994

[30] Foreign Application Priority Data

Nov. 9, 1993 [JP] Japan ................... 5-279817

[51] Int. Cl.$^6$ ................................ H04J 3/16
[52] U.S. Cl. ........................ 370/341; 370/431
[58] Field of Search ................ 370/94, 94.1, 94.2, 370/60, 60.1, 68.1, 110.1, 79, 85.7, 95.1, 95.2, 95.3, 17, 13, 112, 105.1, 58.2; 379/59, 60, 63, 61, 58; 455/33.1, 33.2, 33.3, 38.1, 54.1, 4.2, 56.1

[56] References Cited

U.S. PATENT DOCUMENTS 5,299,198  3/1994  Kay et al. .................. 370/95.3
5,305,315  4/1994  Lee ............................ 370/84

FOREIGN PATENT DOCUMENTS 1-291554  11/1989  Japan.

Primary Examiner—Dang Ton
Attorney, Agent, or Firm—Foley & Lardner

[57] ABSTRACT

A channel allocation control is performed in an ISDN network comprising full-rate channels each accommodating subrate channels multiplexed therein. A use communication capacity of each full-rate channel is monitored when subrate channel release occurs in any full-rate channel. Referring to the respective use communication capacities of the full-rate channels, subrate channel reallocation is performed such that any subrate channel in use accommodated in a certain full-rate channel is switched to another full-rate channel. The reallocation causes the full-rate channel to be empty. The emptied full-rate channel is released.

12 Claims, 16 Drawing Sheets

SETUP OF COMMUNICATION CHANNEL

FIG.11
REALLOCATION OF SUB-CH
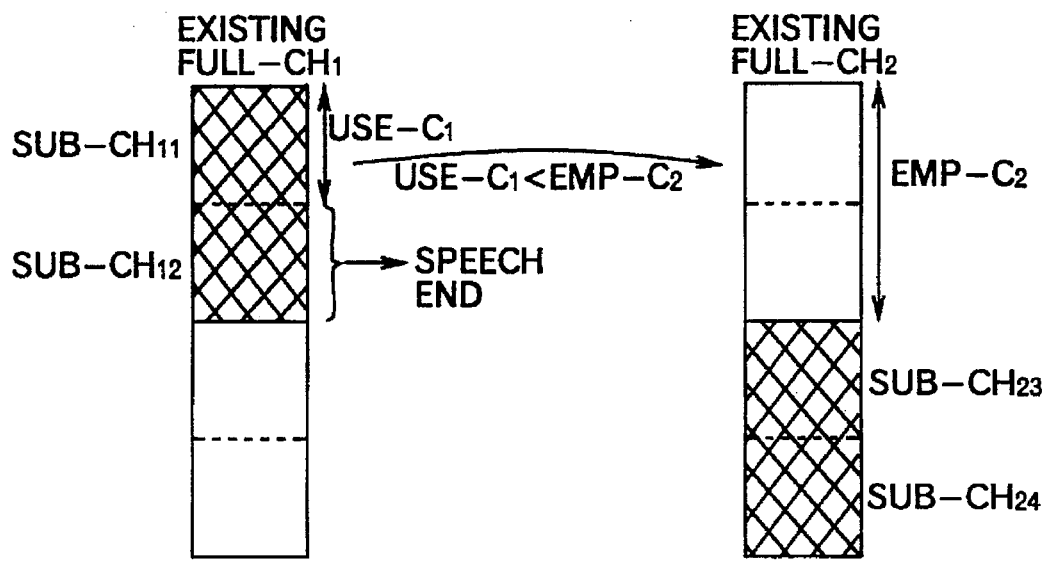
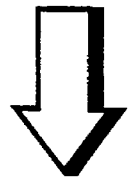
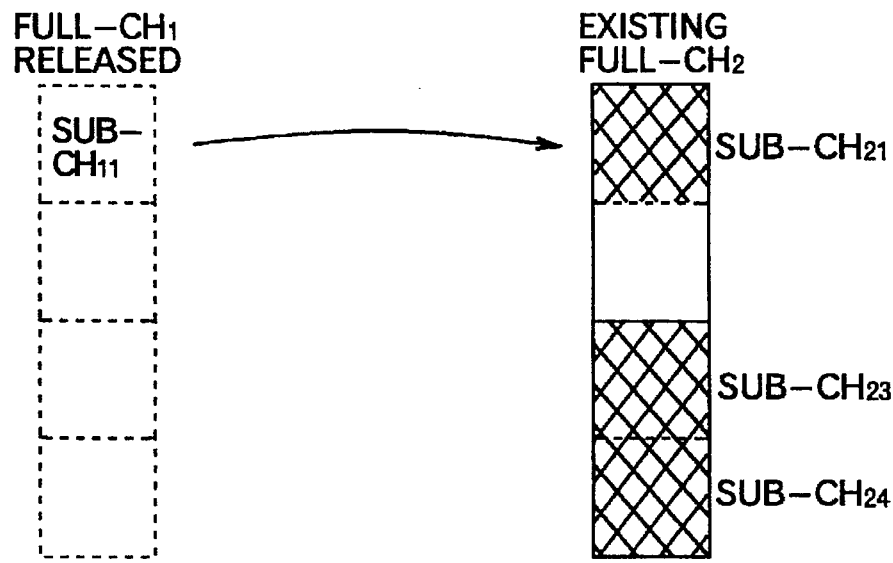

FIG.12
OPERATION OF SUBRATE CHANNEL SWITCH
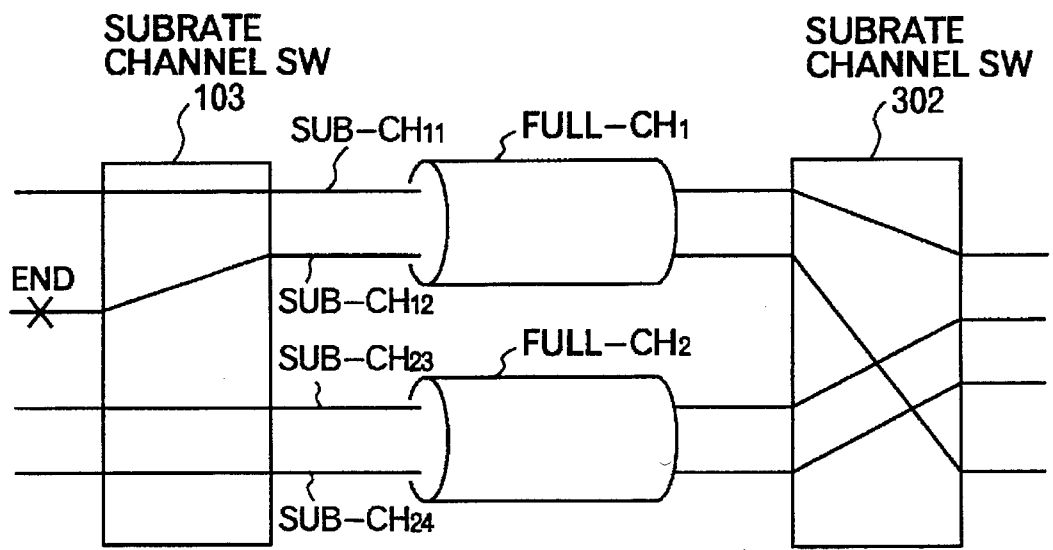
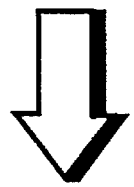
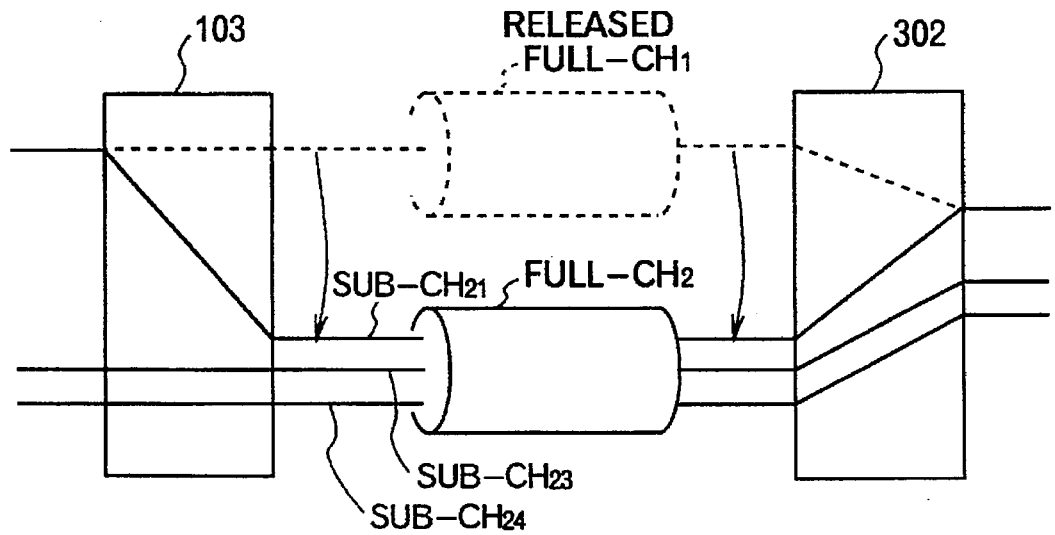

FIG.14
OPERATION OF SUBRATE CHANNEL SWITCH
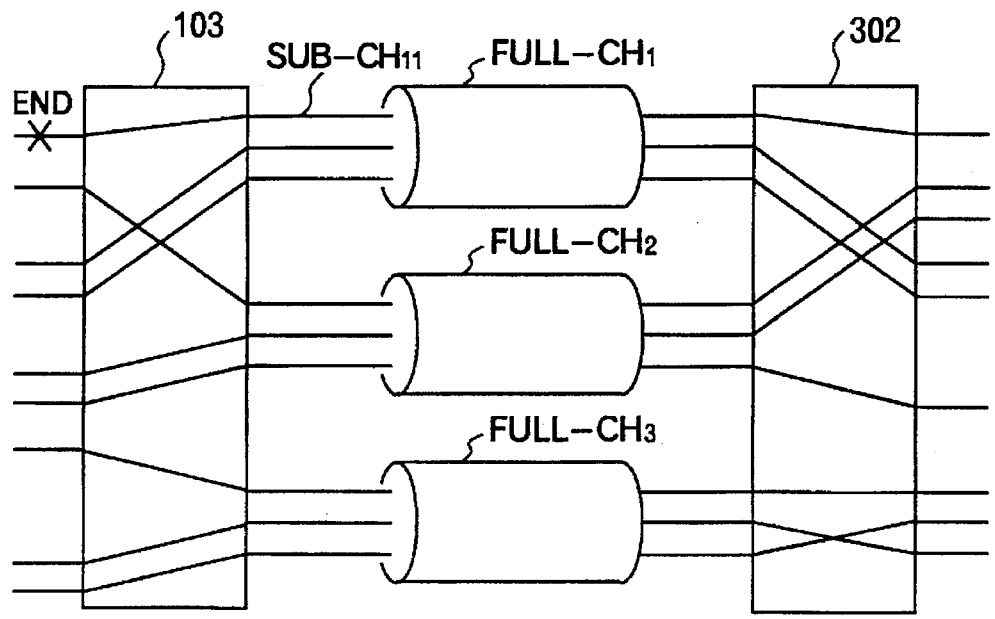
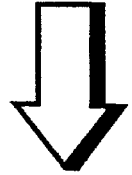
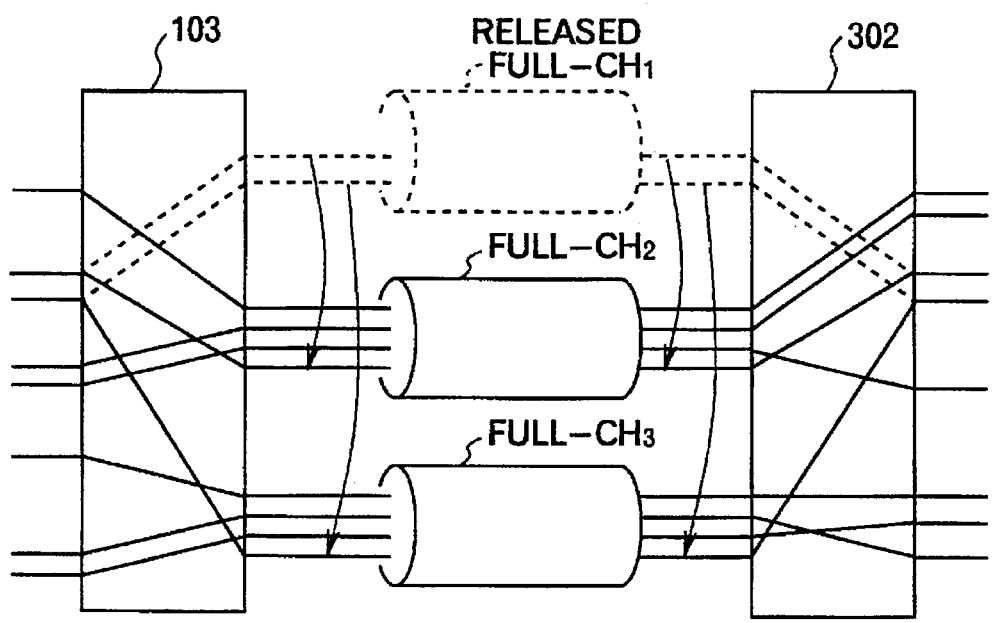

FIG.15
REALLOCATION OF SUB-CH
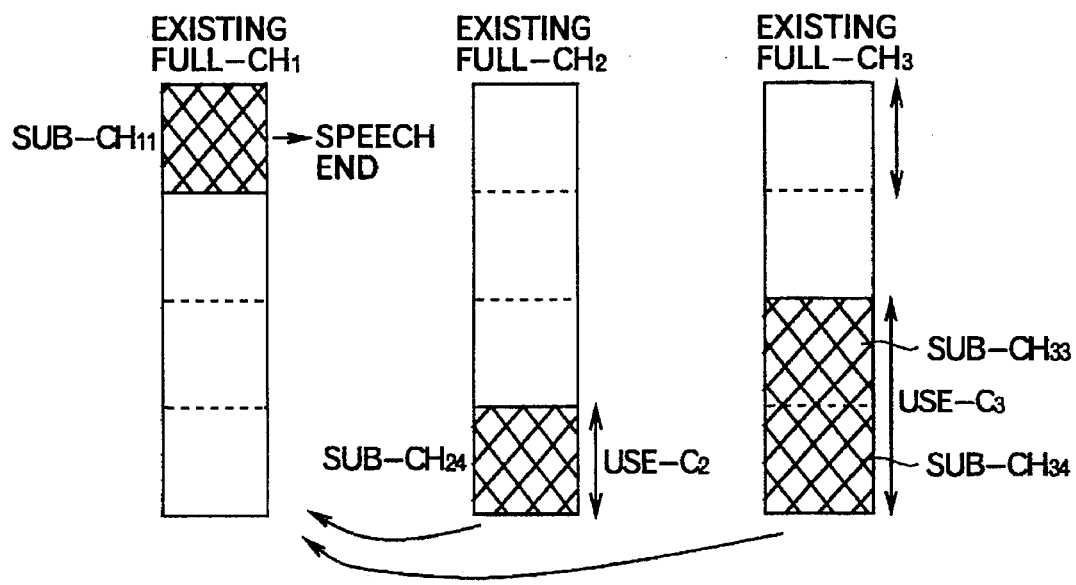
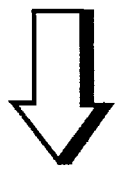
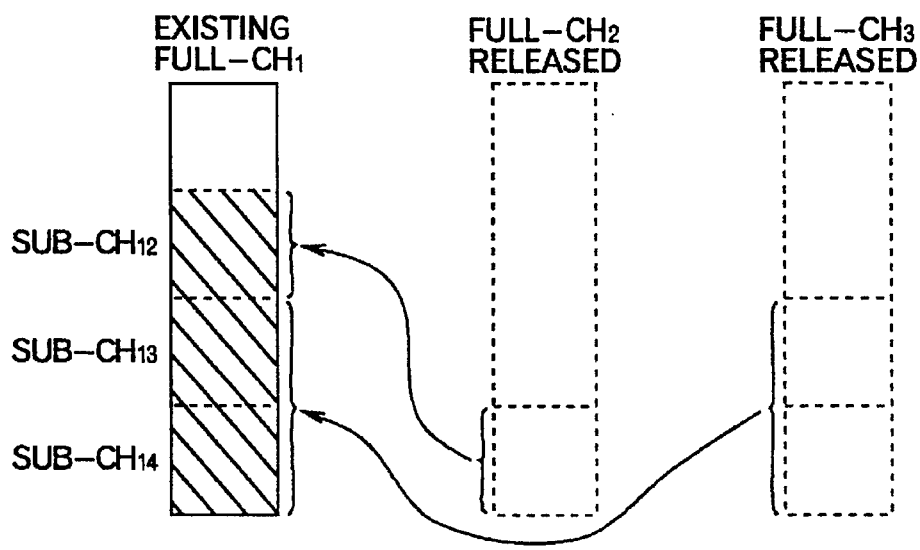

FIG.16
OPERATION OF SUBRATE CHANNEL SWITCH
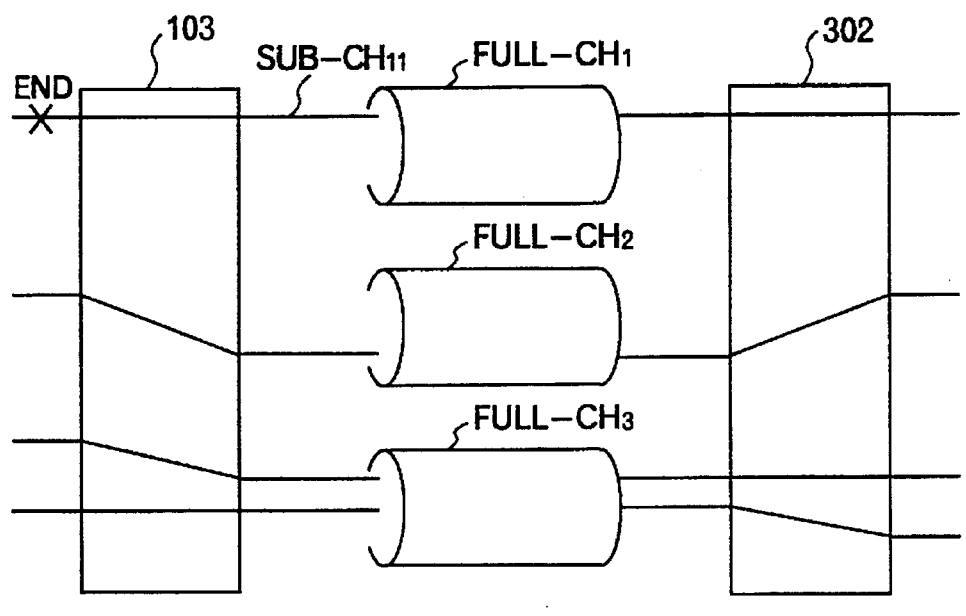
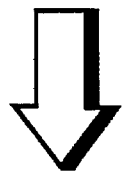
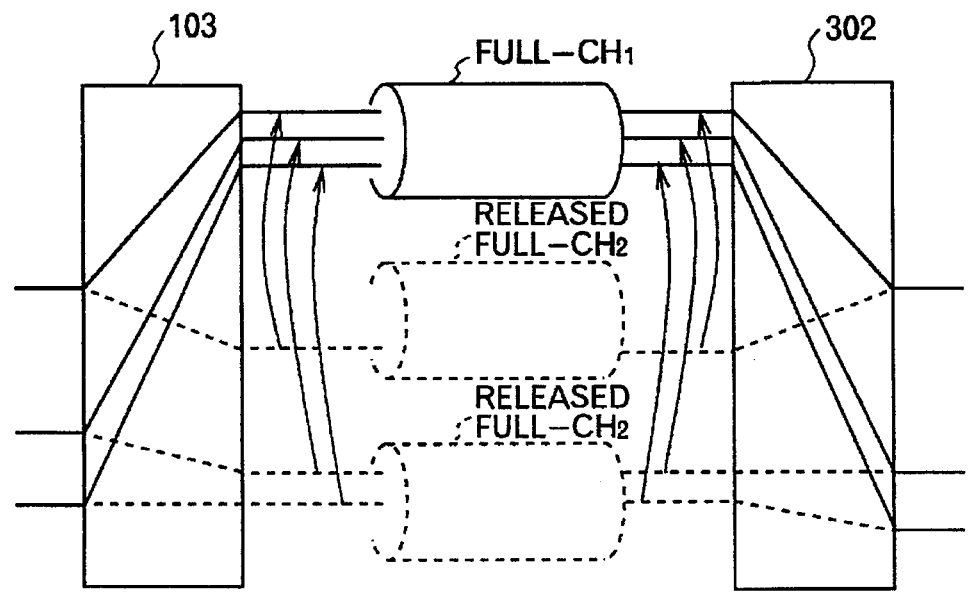

RELOCATION CONTROL OF SUBSTRATE CHANNELS

BACKGROUND OF THE INVENTION

1. Field of the Invention

The present invention relates generally to channel allocation control in a transmission network comprising a plurality of full-rate channels each comprising a plurality of subrate channels and, more particularly, to a control method and system for allocating subrate channels between nodes connected through an Integrated Services Digital Network (ISDN).

2. Description of the Related Art

A subrate-channel multiplex connection system in which private branch exchanges (PBXs) are connected through ISDN has been proposed (see Japanese Unexamined Patent Publication No. 1-291554). In this system, when there is a channel through which a call has been already set up between a certain private branch exchange and another, if another call occurs between the same private branch exchanges, then the new call is multiplexed to empty bits existing in the channel. In other words, according to this connection system, since a plurality of subrate channels of low-speed capacity are formed in an already setup full-rate channel of the ISDN, it has not been necessary to allocate a new full-rate channel each time a call occurs, which can contribute to the increased efficiency in using channels.

However, in the conventional system, no consideration has been given to channel control when communication is finished. Therefore, there have arisen some cases in which, when communications end and several subrate channels are released, some full-rate channels are left in a substantially unused state. For example, it is assumed that three subrate channels in a certain full-rate channel are in use. Under this condition, when the two subrate channels are released by communications ending, only one subrate channel remains in this full-rate channel. The increased number of full-rate channels like that causes the increased charge and the reduced efficiency in using communication lines as a whole.

Further, in the conventional system, it has been necessary that a first setup request be carried out so as to set up a full-rate channel and then a second setup request be further carried out so as to set up a subrate channel in this full-rate channel. Therefore, a call setup signal has been necessarily sent twice. Since a particular coding has been needed for a call setup signal, it has been required to provide a particular device to enable this operation.

SUMMARY OF THE INVENTION

It is an object of the present invention to provide a channel allocation control achieving the improved use efficiency of channels in a transmission network.

A channel allocation control according to the present invention is performed in a network system comprising a plurality of full-rate channels each accommodating a plurality of subrate channels multiplexed therein. In the network system, a use state of each full-rate channel is monitored when subrate channel release occurs in a full-rate channel. Referring to the respective use states of the full-rate channels, any subrate channel in use accommodated in one or more full-rate channels is switched to one or more other full-rate channels. This switch operation causes one or more full-rate channels to be empty. Any full-rate channel accommodating no subrate channel is released.

The use state of each full-rate channel is preferably its use communication capacity and/or its empty capacity. As an embodiment, a use communication capacity of a full-rate channel in which subrate channel release occurs and empty capacities of other full-rate channels are monitored. If the total empty capacity of other full-rate channels is equal to or greater than the use communication capacity of the full-rate channel, any subrate channel in use accommodated in the full-rate channel is switched to one of the other full-rate channels. As a result, the full-rate channel becomes empty and is released.

In the case where the network system is an ISDN network, setup and release of a full-rate channel can be made using a setup signal and a disconnect signal, respectively. Setup and release of a subrate channel can be also made using User—User Information element (UUI).

The invention can be further understood with reference to the illustrations of preferred embodiments of the method and apparatus of the present invention which follow.

BRIEF DESCRIPTION OF THE DRAWINGS

FIG. 11 is an operational diagram for explaining a first example (1) of reallocation of a subrate channel;

FIG. 12 is an explanatory view of an operation of subrate channel switches in the first example (1);

FIG. 14 is an explanatory view of an operation of subrate channel switches in the second example (2);

FIG. 15 is an operational diagram for explaining a third example (3) of reallocation of subrate channels; and FIG. 16 is an explanatory view of an operation of subrate channel switches in the third example (3).

DETAILED DESCRIPTION OF THE PREFERRED EMBODIMENTS

Figure 1:
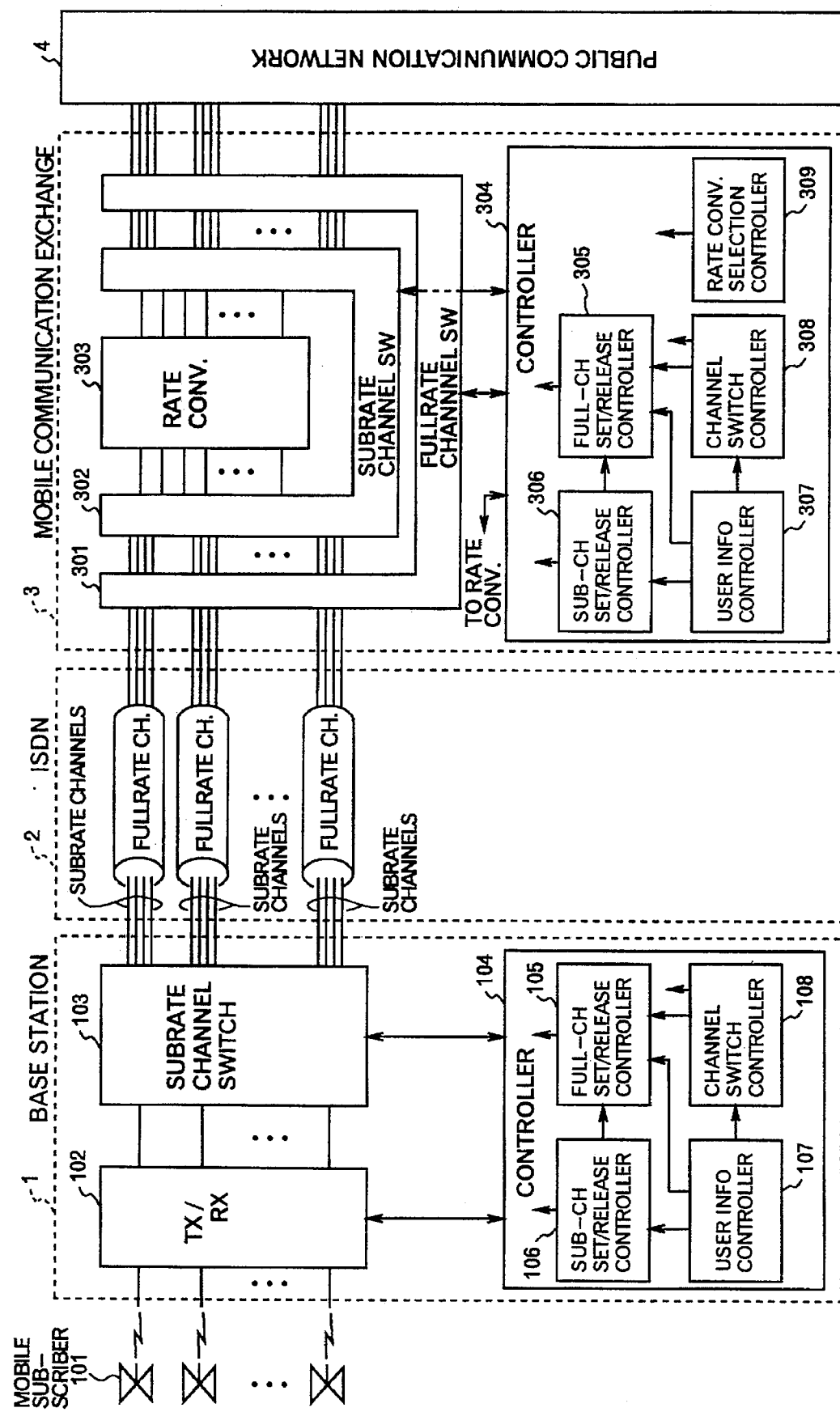
FIG. 1 is a block diagram of a mobile communication system employing an embodiment of a channel allocation system according to the present invention.

Referring to FIG. 1, a mobile communication system is comprised of a plurality of base stations (each indicated by numeral 1) and a plurality of mobile subscribers (each indicated by numeral 101). Since each base station has been allocated a prescribed number of channels, a base station 1 can accommodate mobile subscribers as many as the channels allocated thereto. The base station 1 is connected to a mobile communication exchange 3 through an ISDN network 2. The mobile communication exchange 3 is further connected to a public communication network 4.

The ISDN network 2 is capable of setting up a plurality of physical communication channels (each referred to as a full-rate channel or a FULL-CH, hereinafter). In each of the full-rate channels a plurality of logical communication channels are multiplexed, each logical communication channel having a smaller communication rate than a full-rate channel. Hereinafter, a logical communication channel is referred to as a subrate channel or a SUB-CH.

In the present embodiment, it is assumed that a mobile subscriber 101 is connected to a base station 1 through a radio communication channel of 16 k bps(bits/second) and that the maximum transmission rate of a full-rate channel in the ISDN network 2 is 64 k bps and that of a subrate channel is 16 k bps. Accordingly, four subrate channels can be multiplexed in one full-rate channel. When a communication setup request for a communication rate of 16 k bps occurs between a mobile subscriber public communication network 4 through the full-rate channel switch 301, the subrate channel switch 302, and the communication rate converter 303.

The subrate channel switch 302 has the same function as the subrate channel switch 103 of the base station 1, as will be described later. The communication rate converter 303 includes a plurality of rate converters. One rate converter is selected and allocated to one subrate channel.

The controller 304 is, similar to the controller 104 of the base station 1, comprised of a full-rate channel setup/release controller 305, a subrate channel setup/release controller 306, a user information controller 307, and a channel switch controller 308. In addition, the controller 304 is further provided with a communication rate selection controller 309 for selecting one of the communication rate converter 303.

The full-rate channel setup/release controllers 105 and 305, and the subrate channel setup/release controllers 106 and 306 respectively control the setup/release of full-rate channels and subrate channels. The control of channel setup/release is executed by using data which is generated by the user information controller 107 and 307 analyzing the channel using situation in the ISDN 2.

In the case where a full-rate channel is set up, a SETUP signal necessary for setting up the full-rate channel is generated and output to the full-rate channel setup/release controller. Further, in the case where a subrate channel is set up, a user information element (UUI) required for setting up the subrate channel is generated and output to the subrate channel 101 and a subscriber of the public communication network, a new subrate channel will be set up in one of the full-rate channels in the ISDN network 2 and communication between them will be carried out through the subrate, as will be described later.

The base station 1 is comprised of a transmitter/receiver 102 for communicating with mobile subscribers 101, a subrate channel switch 103 for switching an arbitrary subrate channel to any full-rate channel, and a controller 104 for controlling them. For simplicity of the figure, such functions as to set up and release a full-rate channel or a subrate channel are included in the subrate channel switch 103.

The setup/release control of a full-rate channel is performed by a full-rate channel setup/release (FULL-CH S/R) controller 105 and that of a subrate channel by a subrate channel setup/release (SUB-CH S/R) controller 106 in accordance with data generated by a user information controller 107. Switching of subrate channels performed by the subrate channel switch 103 is controlled by a channel switch controller 108.

The mobile communication exchange 3 is comprised of a full-rate channel switch 301, a subrate channel switch 302, a communication rate converter 303, and a controller 304. For a sound signal of 64 kbps using one full-rate channel, the full-rate channel switch 301 directly connects the ISDN 2 to the public communication network 4 without passing it through the communication rate converter 303. In the case of a subrate channel requiring rate conversion between the subrate channel and the public communication network 4, as in the case of the present embodiment, the subrate channel is connected to the setup/release controller. In the case where a full-rate channel has been already set up, a UUI necessary for setting up a subrate channel in the full-rate channel is generated and output to the full-rate channel setup/release controller.

Additionally, in the case where a subrate channel is released, a UUI for releasing the subrate channel is generated and output to the subrate channel setup/release controller. In the case where a full-rate channel is released, a disconnect signal for releasing the full-rate channel is generated and output to the full-rate channel setup/release controller.

The respective channel switch controllers 108 and 308, receiving a communication state of the full-rate channels and the subrate channels, control the subrate channel switches 103 and 302 such that a subrate channel is switched to a desired full-rate channel.

Figure 2:
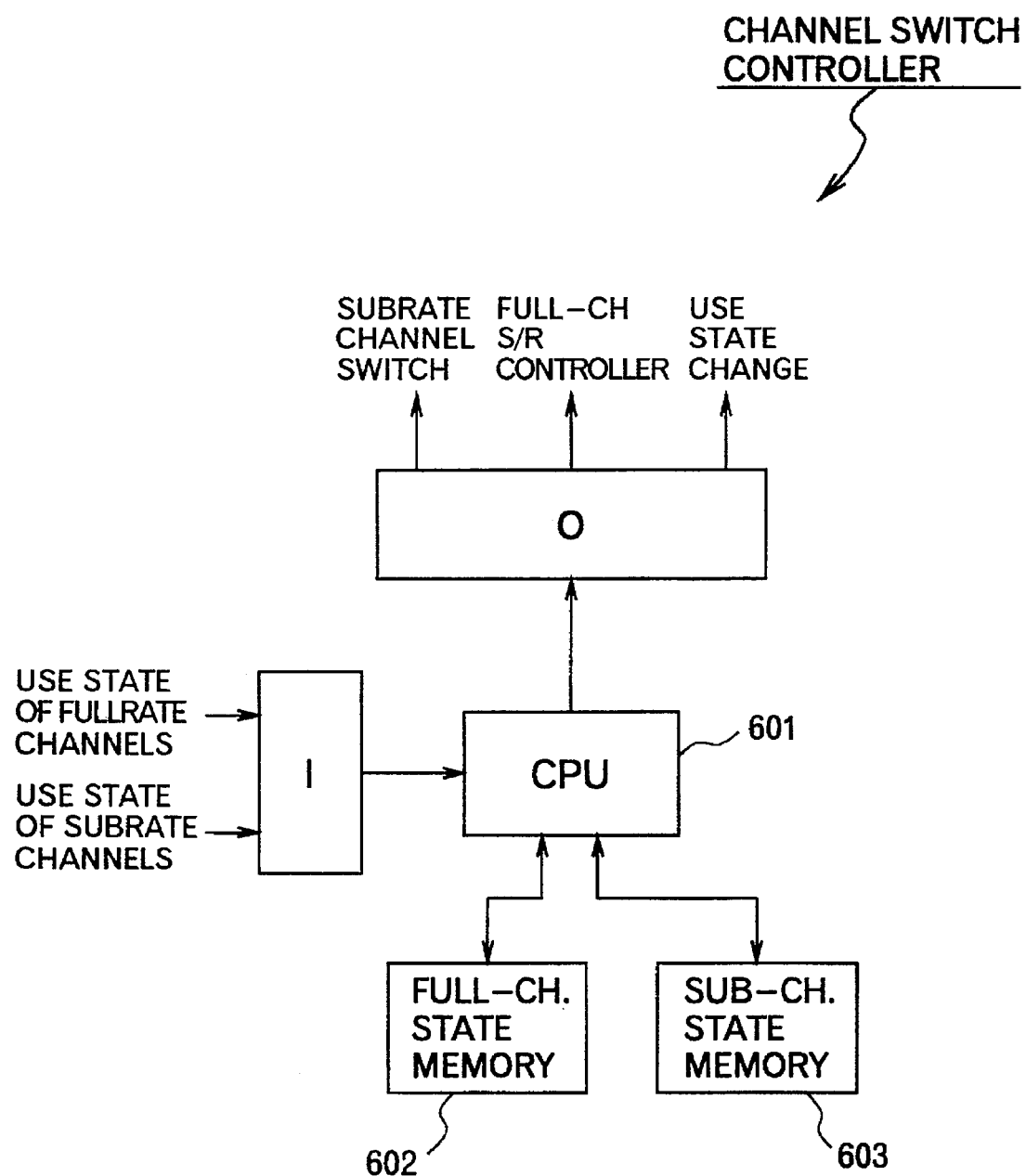
FIG. 2 is a block diagram of a channel switch controller in this embodiment.

Referring to FIG. 2, the channel switch controller (108 and 308) is comprised of a central processing unit (CPU) 601, a control memory 602 for storing a use state of full-rate channels and a control memory 603 for storing a use state of subrate channels. The CPU 601 outputs a switch control signal to the subrate channel switch (103 and 302) using the control memories 602 and 603. The switch control of subrate channels will be described in more detail with reference to FIGS. 8 to 16.

Figure 3:
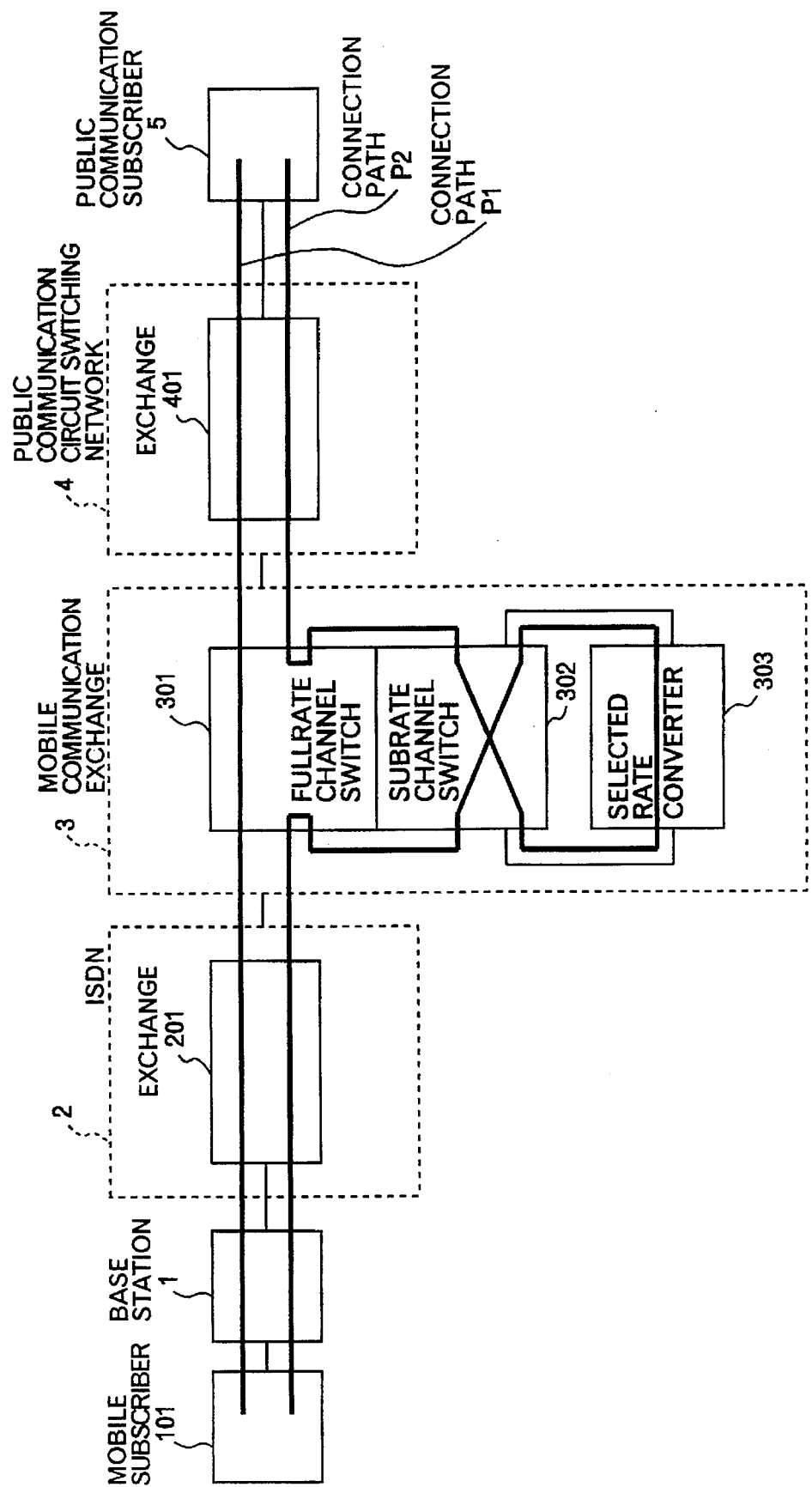
FIG. 3 is a schematic block diagram showing signal paths in a mobile communication exchange of the mobile communication system.

The rate converter selection controller 309 in the controller 304 of the mobile communication exchange 3 selects one of the communication rate converters 303 and allocates it to a subrate channel. When, as is illustrated in FIG. 3, a difference in communication rate is present between the mobile subscriber 101 and a public communication subscriber 5 as in the present embodiment, a subrate channel is connected to one communication rate converter 303 through the subrate channel switch 302. Since one of the communication rate converters 303 is selected for each call setup, the communication rate converters 303 may be provided as many as the lines satisfying a possible call traffic and a prescribed call loss probability. As a result, the number of communication rate converters may be lower than that of mobile subscribers.

An operation of the present embodiment will be described referring to FIGS. 4 to 8.

SETUP OF CHANNEL

Herein, a case where a call occurs from the mobile subscriber 101 to the subscriber 5 of the public communication network 4 will be explained as an example. When a call occurs in a reverse direction, the similar setup operation is performed. Hereinafter a full-rate channel #i is referred to as 'FULL-CHi' and a subrate channel #j in the full-rate channel #i is referred to as 'SUB-CHij'.

Figure 4:
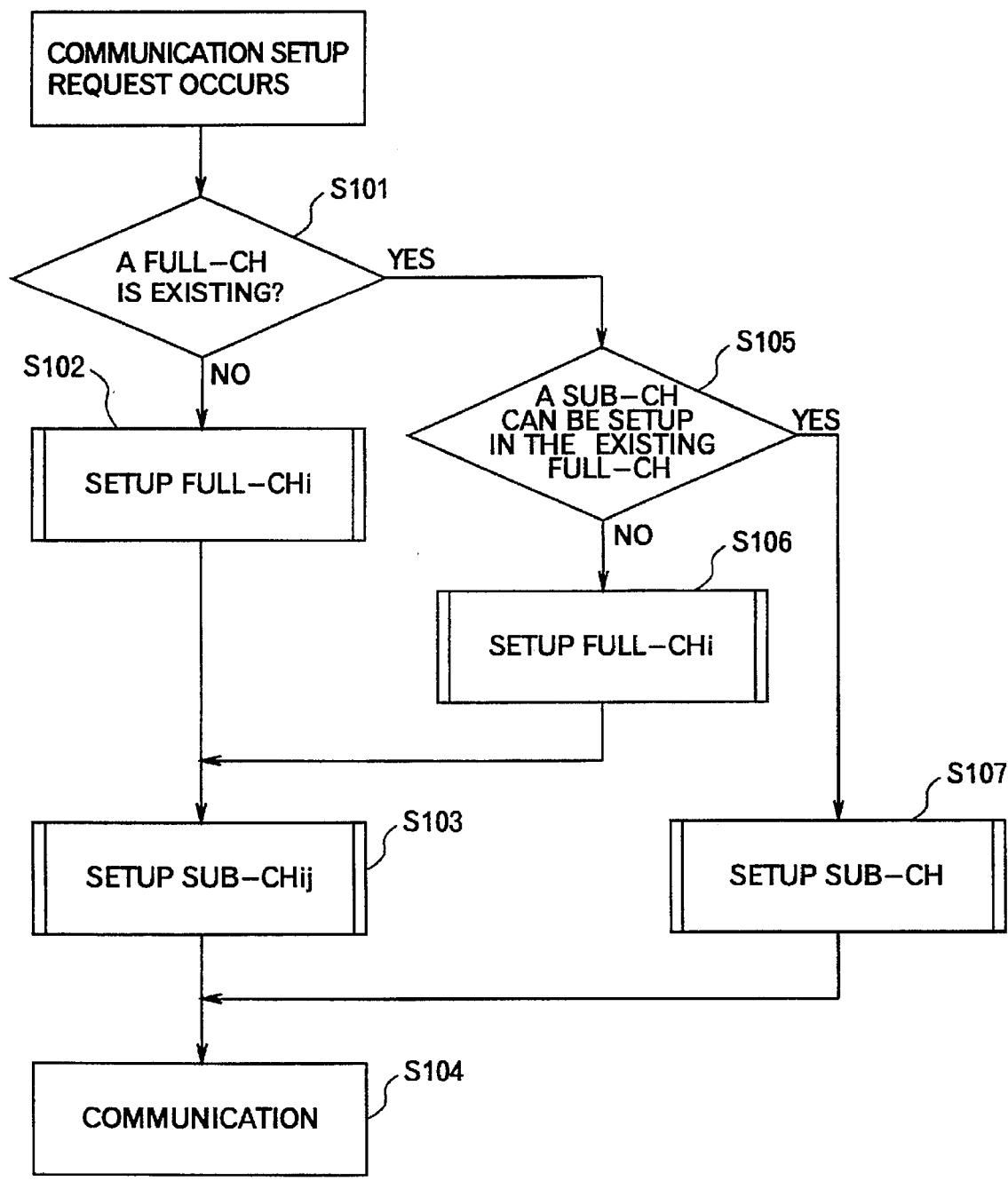
FIG. 4 is a flow chart illustrating a main routine of a channel setup in an embodiment of a channel allocation method according to the present invention.

Referring to FIG. 4, when a communication setup request is received from the base station 1, the controller 104 first checks whether at least a full-rate channel has been already set up in the ISDN network 2 (S101). If no full-rate channel has been set up (in the case of No in S101), then the ISDN 2 sets up a new full-rate channel FULL-CHi in accordance with the setup request received from the full-rate channel setup/release controller 105 (S102). Further, the subrate channel setup/release controller 306 of the mobile communication exchange 3 sets up a subrate channel SUB-CHij in the full-rate channel FULL-CHi in accordance with the UUI received from the subrate channel setup/release controller 106 of the base station 1 (S103). Through the setup subrate channel SUB-CHij the mobile subscriber 101 can communicate with the subscriber 5 of the public communication network 4 (S104).

If a full-rate channel has been already set up (Yes in S101), it is checked whether a subrate channel can be multiplexed onto that full-rate channel (S105). If all of the subrate channels of the full-rate channel are used and any subrate channel cannot be further multiplexed (No in S105), a new full-rate channel as mentioned above will be set up (S106). If a new subrate channel can be multiplexed on the existing full-rate channel (Yes in S105), then the new subrate channel will be set up in the existing full-rate channel (S107).

SETUP OF FULL-RATE CHANNEL

Figure 5A:
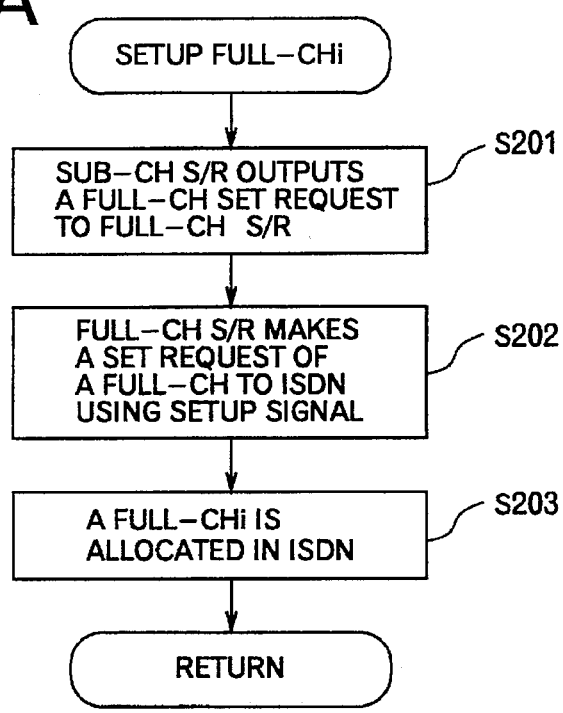
FIG. 5A is a flow chart showing a subroutine of a full-rate channel setup in FIG. 4.

FIG. 5A shows a subroutine for setting up a full-rate channel. First, the subrate channel setup/release controller 106 requests the full-rate channel setup/release controller 105 to set up a full-rate channel between the base station 1 and the mobile communication exchange 3 (S201). In accordance with this request, the full-rate channel setup/release controller 105 sends a call setup request for a full-rate channel to the ISDN 2 using a SETUP signal for circuit switching in ISDN Network Layer formed by the user information controller 107 (S202). Thus, the ISDN 2 allocates a full-rate channel FULL-CHi for connecting the base station 1 to the mobile communication exchange 3 (S203).

SETUP OF SUBRATE CHANNEL

Figure 5B:
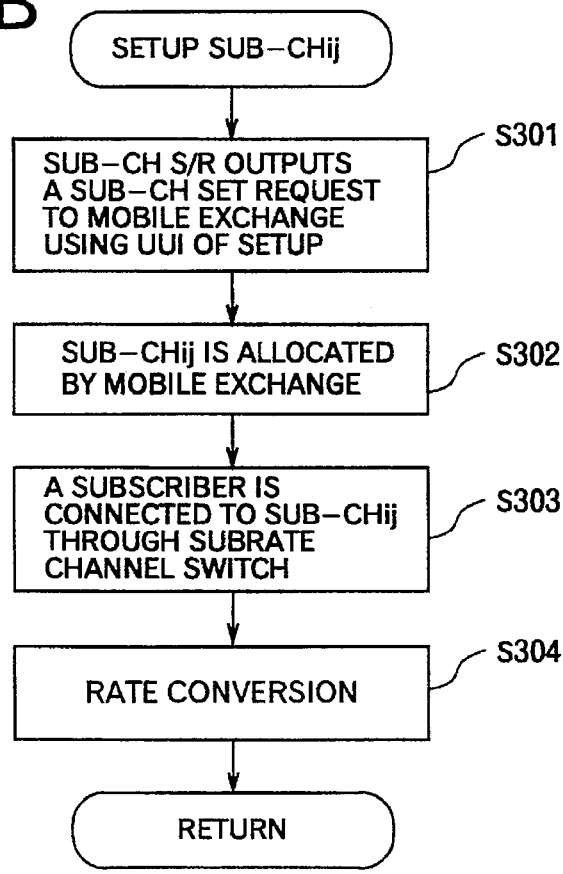
FIG. 5B is a flow chart showing a subroutine of a subrate channel setup in FIG. 4.

FIG. 5B shows a subroutine for setting up a subrate channel. The subrate channel setup/release controller 106 first requests the mobile communication exchange 3 to set up a new subrate channel in an existing full-rate channel FULL-CHi by using a user information element (UUI) associated with the setup signal for circuit switching in the ISDN Network Layer formed by the user information controller 107 (S301). According to the received UUI, the subrate channel setup/release controller 306 of the mobile communication exchange 3 allocates a subrate channel SUB-CHij (S302). Thus, the mobile subscriber 101, the subscriber 5 of the public communication network 4, and the subrate channel SUB-CHij are connected through the subrate channel switches 103 and 302 (S303). At this time, in the mobile communication exchange 3, one of the communication rate converters 303 is selected by the communication rate converter selection controller 309 (S304), so that subrate channel SUB-CHij is connected to the public communication network 4.

In the manner as stated above, a communication channel is set up between the mobile subscriber 101 and the subscriber 5 of the public communication network 4.

RELEASE OF CHANNEL

Herein, a case in which the mobile subscriber 101 finishes communication and then a channel release request is sent from the base station 1 to the mobile communication exchange 3 will be described as an example. Also, in the case where the communication release request is sent in the reverse direction, an operation is carried out in a similar manner to the above.

Figure 6:
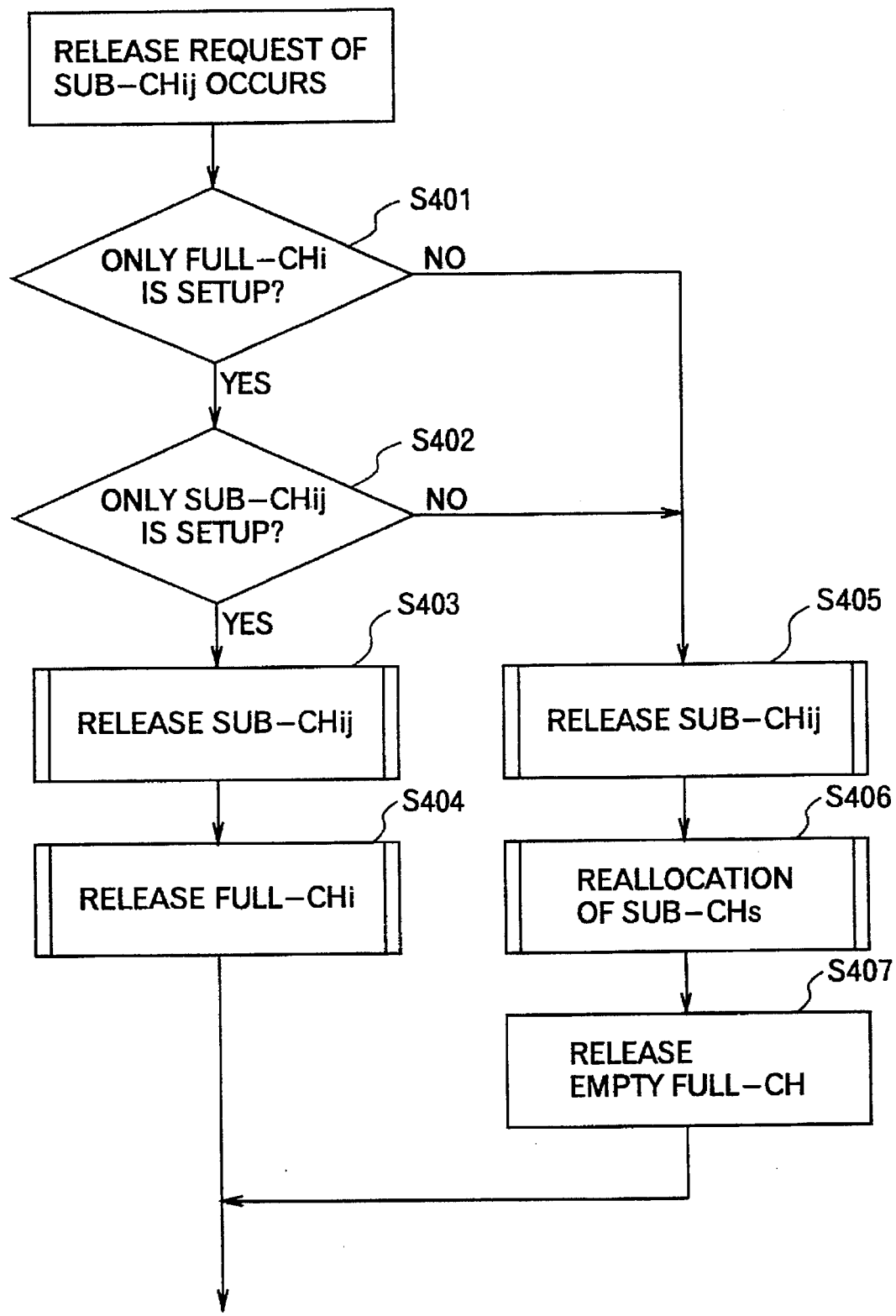
FIG. 6 is a flow chart showing a main routine of a channel release in the present embodiment.

Referring to FIG. 6, if the release request of a using subrate channel SUB-CHij occurs, the controller 104 checks whether the full-rate channel FULL-CHi is the only full-rate channel that has been set up (S401). If the full-rate channel FULL-CHi is (Yes of S401), the controller checks whether the subrate channel SUB-CHij is the only subrate channel that has been set up in the full-rate channel FULL-CHi (S402).

If the subrate channel SUB-CHij is the only subrate channel that has been set up (Yes in S402), the subrate channel SUB-CHij is released (S403), and subsequently the full-rate channel FULL-CHi is released (S404).

If any other full-rate channel has been set up, or if any other subrate channel has been set up in the full-rate channel FULL-CHi (No in S401 or No in S402), then the subrate channel SUB-CHij is released (S405), and subsequently the remaining subrate channels are reallocated by the subrate channel switches 103 and 302 (S406). If the reallocation causes some full-rate channels to be empty, the empty full-rate channels are released (S407).

RELEASE OF SUBRATE CHANNEL

Figure 7A:
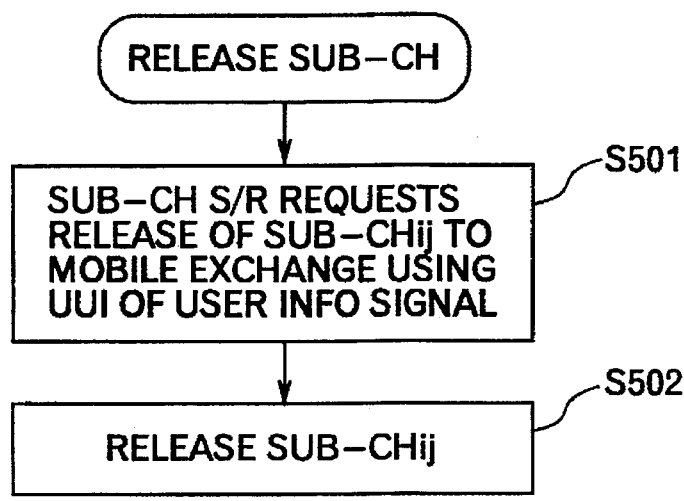
FIG. 7A is a flow chart showing a subroutine of the release of a subrate channel in FIG. 6.

FIG. 7A illustrates a release subroutine for a subrate channel. The subrate channel setup/release controller 106 initially requests the mobile communication network 3 to release the subrate channel SUB-CHij by using a user information element (UUI) in a user information signal for circuit switching in the ISDN Network Layer, the UUI being formed by the user information controller 107 (S501). Thus, the subrate channel setup/release controller 306 releases the subrate channel SUB-CHij (S502).

RELEASE OF FULL-RATE CHANNEL

Figure 7B:
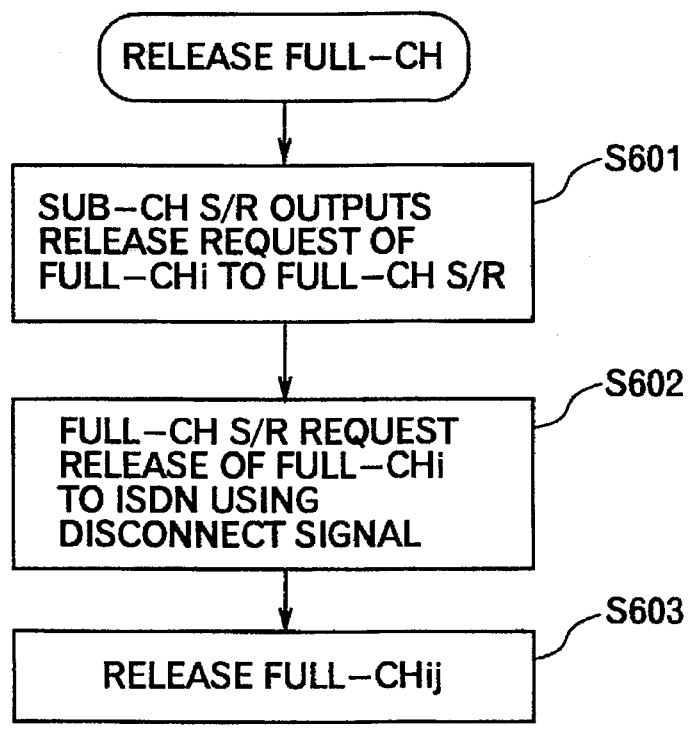
FIG. 7B is a flow chart showing a subroutine of the release of a full-rate channel in FIG. 6.

FIG. 7B illustrates a release subroutine for a full-rate channel. The subrate channel setup/release controller 106 initially requests the full-rate channel setup/release controller 105 to release the full-rate channel FULL-CHi (S601). Based on this request, the full-rate channel setup/release controller 105 sends the ISDN 2 a disconnected signal of the FULL-CHi which is formed by the user information controller 107 so as to request the release of the FULL-CHi (S602). Receiving this release request, the ISDN 2 releases the full-rate channel FULL-CHi (S603).

REALLOCATION OF SUBRATE CHANNELS

Figure 8:
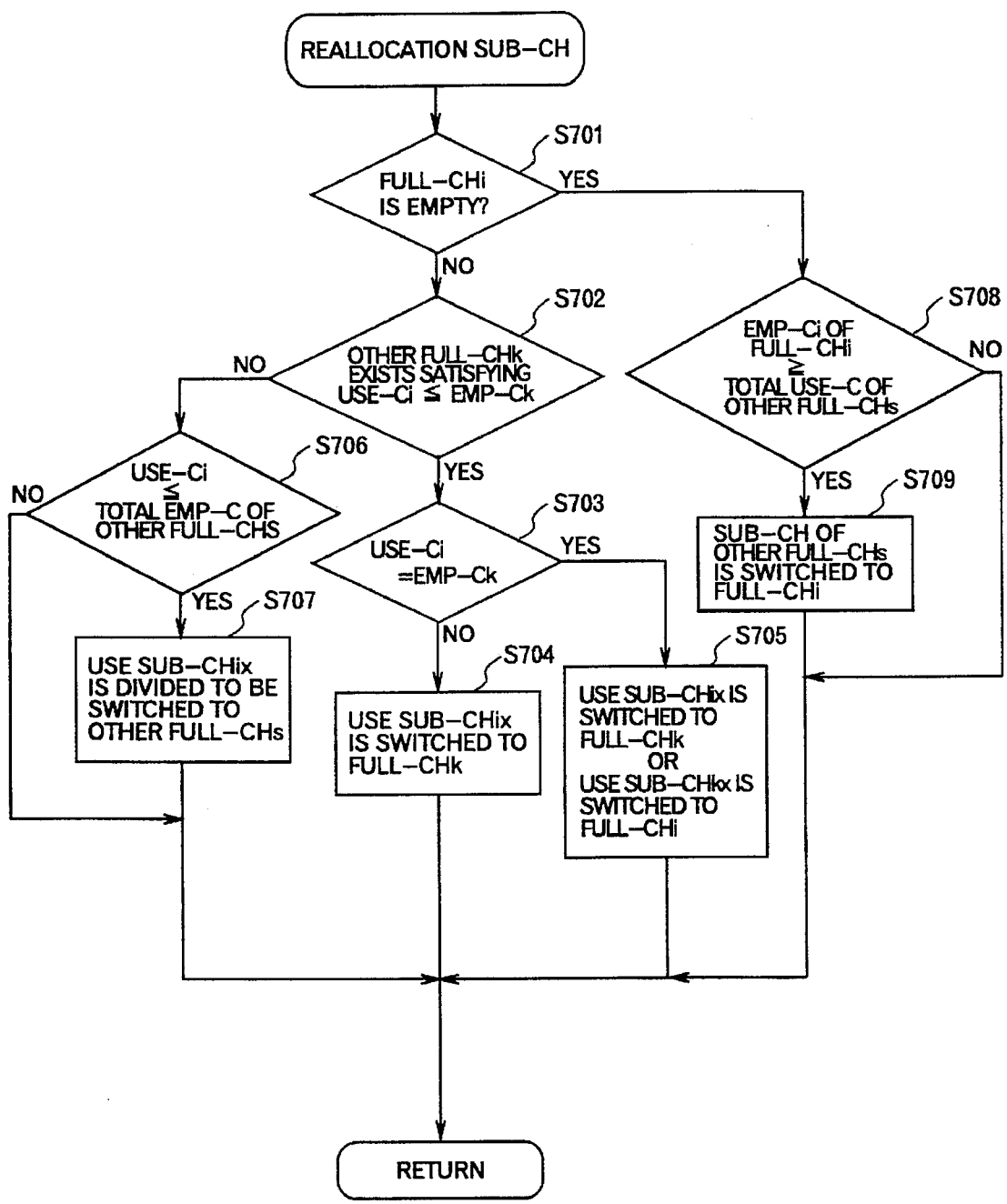
FIG. 8 is a flow chart showing a subroutine of the reallocation of subrate channels in FIG. 6.

FIG. 8 illustrates an example of a reallocation subroutine of subrate channels. This operation is carried out by the channel switch controller 108 and the subrate channel switch 103 in the base station 1 and the channel switch controller 308 and the subrate channel switch 302 in the mobile communication exchange 3. When a certain subrate channel multiplexed in a full-rate channel is released, the remaining subrate channels in the full-rate channel are reallocated to other existing full-rate channels. In this way, the number of full-rate channels in use is optimally minimized so that the efficient use of the full-rate channels is achieved.

After a subrate channel SUB-CHij has been released (S405 in FIG. 6), the channel switch controller 108 initially checks whether the full-rate channel FULL-CHi is empty (S701). If other subrate channels remain in the full-rate channel FULL-CHi (No in S701), then the channel switch controller 108 checks whether there is found any other full-rate channel FULL-CHk having an empty capacity EMP-Ck (or usable capacity) equal to or greater than the occupied capacity (or in-use capacity) USE-Ci of the full-rate channel FULL-CHi (S702).

If another full-rate channel FULL-CHk is found with satisfying the inequality: USE-Ci≦EMP-Ck (Yes in S702), then the channel switch controller 108 controls the subrate channel switch 103 to switch all in-use subrate channels use.SUB-CHix in the full-rate channel FULL-CHi to the other full-rate channel FULL-CHk (S704), where the respective suffixes x and k indicate an arbitrary integer. As a result, the full-rate channel FULL-CHi becomes empty and is released by a subsequent process (S407 in FIG. 6).

If USE-Ci=EMP-Ck (Yes in S703), all in-use subrate channels use.SUB-CHix which are found in the full-rate channel FULL-CHi may be switched to the other full-rate channel FULL-CHk. Conversely, all use.SUB-CHkx which are found in the full-rate channel FULL-CHk may be switched to the full-rate channel FULL-CHi (S705). In either case, the emptied full-rate channel is released by the subsequent process (S407 in FIG. 6).

If there is no other full-rate channel having an empty capacity EMP-Ck equal to or greater than USE-Ci (No in S702), then it is checked whether there are two or more full-rate channels FULL-CHs having the total capacity, EMP-C$_{total}$, of respective empty capacities thereof equal to or greater than the occupied capacity USE-Ci of the full-rate channel FULL-CHi (S706). If such full-rate channels FULL-CHs are found, the in-use subrate channels, use.SUB-CHix, in the full-rate channel FULL-CHi are divided among the full-rate channels FULL-CHs (S707).

If any other subrate channel is found in the full-rate channel FULL-CHi (Yes in S701), then it is checked whether there is found other full-rate channel FULL-CHs having the total capacity, USE-C$_{total}$, of respective occupied capacities thereof not greater than the empty capacity EMP-Ci of the full-rate channel FULL-CHi (S708). If such full-rate channels FULL-CHs are found (Yes in S708), all subrate channels of those full-rate channels FULL-CHs are switched to the full-rate channel FULL-CHi (S709).

The full-rate channels which are emptied by such a switching operation of subrate channels are released by the subsequent processing (S407 in FIG. 6).

EXAMPLES OF CHANNEL ALLOCATION

Figure 9:
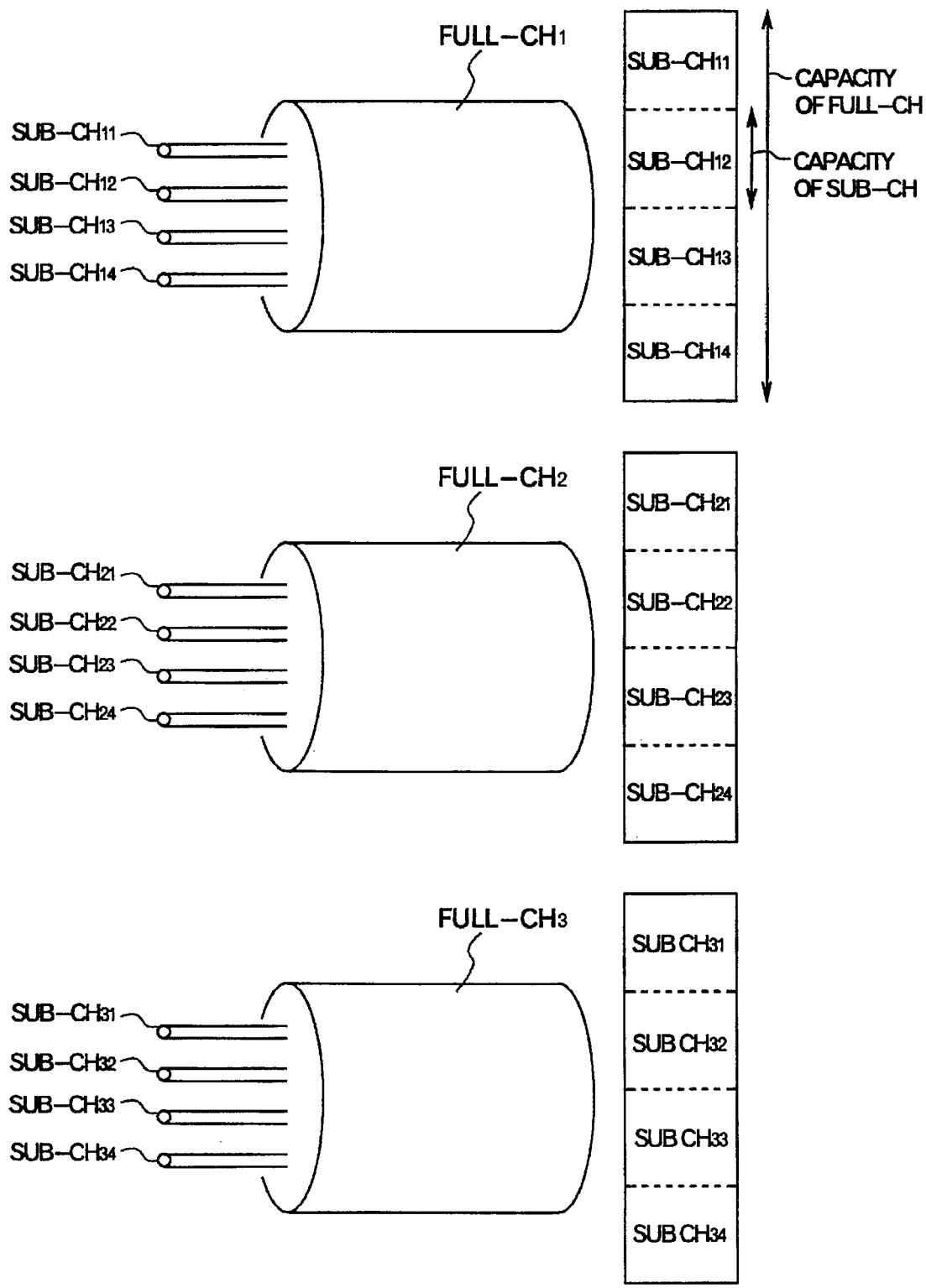
FIG. 9 is a schematic diagram showing the full-rate channels each including subrate channels.

As illustrated in FIG. 9, four subrate channels SUB-CH$_{11}$ to SUB-CH$_{14}$ (each having 16 k bps) can be multiplexed onto each full-rate channel (64 k bps), FULL-CHi, of the full-rate channels FULL-CH$_1$ to FULL-CH$_3$.

EXAMPLES OF CHANNEL SETUP

Figure 10A:
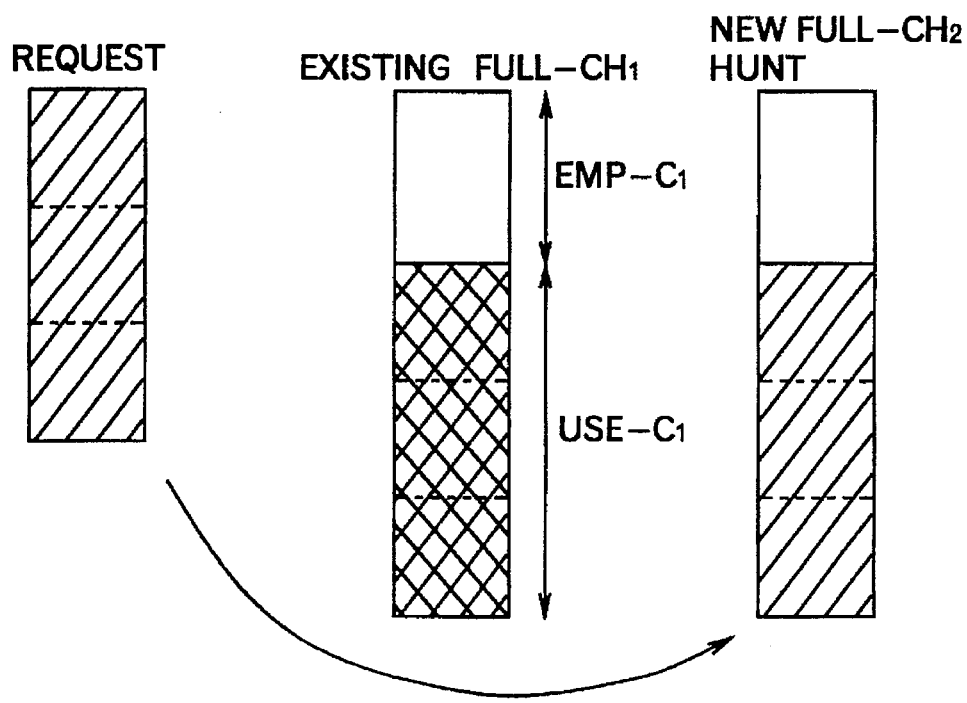
FIG. 10A is an operational diagram for explaining a case in which a subrate channel is set in a new full-rate channel.

As shown in FIG. 10A, it is assumed that subrate channels SUB-CH$_{12}$ to SUB-CH$_{14}$ of the existing full-rate channel FULL-CH$_1$ are being used. In this case, if a call occurs requiring the communication capacity of 16 kbps×3, then a new full-rate channel FULL-CH$_2$ is set up because the required communication capacity is greater than the empty capacity EMP-C$_1$ of the existing full-rate channel FULL-CHi. The three subrate channels corresponding to the required communication capacity are set up in the new full-rate channel FULL-CH$_2$.

Figure 10B:
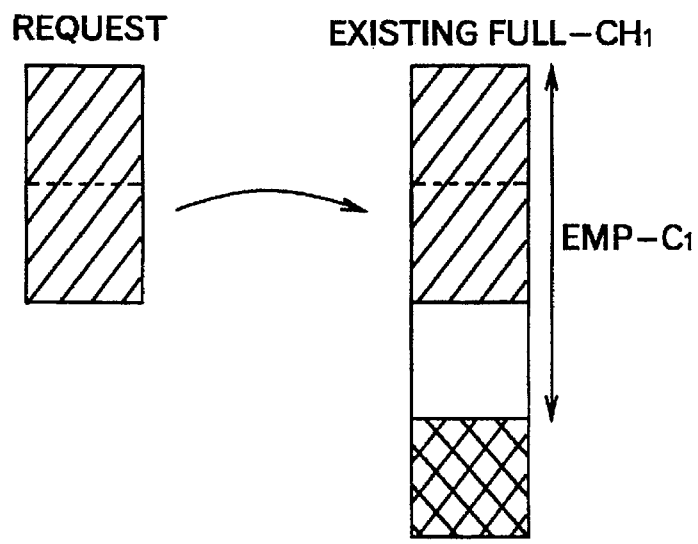
FIG. 10B is an operational diagram for explaining a case in which a subrate channel is set in an existing full-rate channel.

As shown in FIG. 10B, it is assumed that the subrate channel SUB-CH$_{14}$ is only being used in the full-rate channel FULL-CH$_1$. In this case, if a call occurs requiring the communication capacity of 16 kbps×2, new subrate channels SUB-CH$_{11}$ and sub CH$_{12}$ are set up because the required communication capacity is smaller than the empty capacity EMP-C$_1$.

EXAMPLES OF THE REALLOCATION OF SUBRATE CHANNELS

FIG. 11 illustrates a first example of the reallocation of subrate channels and FIG. 12 shows an operation of the subrate channel switches in this example. In this example, it is assumed that the subrate channels SUB-CH$_{11}$ and SUB-CH$_{12}$ of the existing full-rate channel FULL-CH$_1$ and the subrate channels SUB-CH$_{23}$ and SUB-CH$_{24}$ of the full-rate channel FULL-CH$_2$ are set up and in use.

Under this condition, it is assumed that the communication or speech through the subrate channel SUB-CH$_{12}$ of the full-rate channel FULL-CH$_1$ is finished and the subrate channel SUB-CH$_{12}$ is released. In this case, since the capacity USE-C$_1$ of the subrate channel sub CH$_{11}$ remaining in the full-rate channel FULL-CH$_1$ is smaller than the empty capacity EMP-C$_2$ of the full-rate channel FULL-CH$_2$, the subrate channel SUB-CH$_{11}$ is switched to the subrate channel SUB-CH$_{21}$ of the existing full-rate channel FULL-CH$_2$ by the subrate channel switches 103 and 302, as shown in FIG. 12. As a result, the full-rate channel FULL-CH$_1$ is emptied and released.

Figure 13:
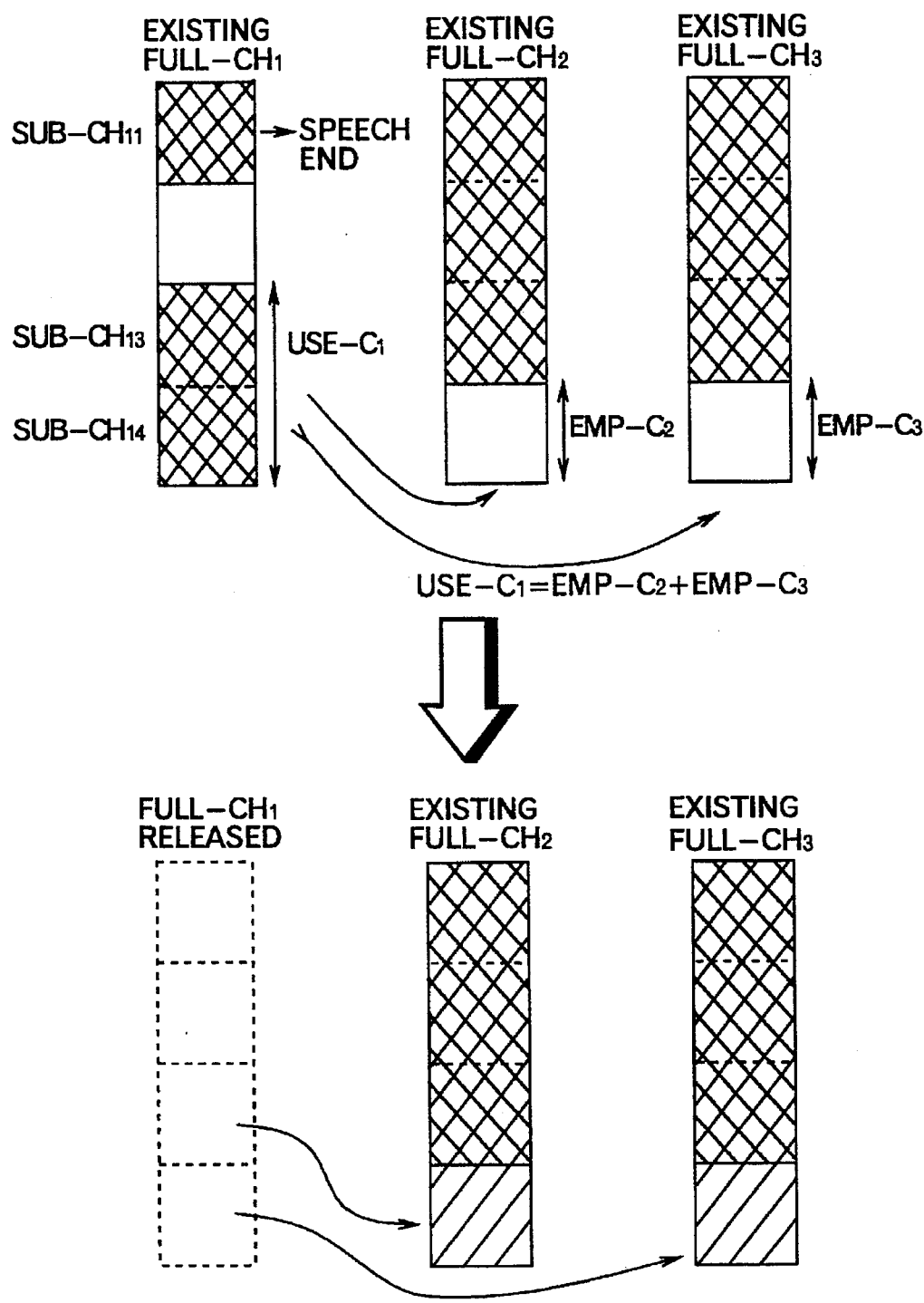
FIG. 13 is an operational diagram for explaining a second example (2) of reallocation of subrate channels.

FIG. 13 illustrates a second example of subrate channel reallocation and FIG. 14 shows an operation of the subrate channel switches in this example. In the present example, it is assumed that the following subrate channels have been set up: subrate channels SUB-CH$_{11}$, SUB-CH$_{13}$ and SUB-CH$_{14}$ of the full-rate channel full CH$_1$, subrate channels SUB-CH$_{21}$ to SUB-CH$_{23}$ of the full-rate channel FULL-CH$_2$, and subrate channels SUB-CH$_{31}$ to SUB-CH$_{33}$ of the full-rate channel FULL-CH$_3$.

Under this condition, it is assumed that communication or speech through the subrate channel SUB-CH$_{11}$ of the full-rate channel FULL-CH$_1$ is completed and the subrate channel sub CH$_{11}$ is released. The total capacity USE-C$_1$ of the subrate channels SUB-CH$_{13}$ and SUB-CH$_{14}$ existing in the full-rate channel FULL-CH$_1$ is equal to the total of empty capacities, EMP-C$_2$+EMP-C$_3$, of the full-rate channels FULL-CH$_2$ and FULL-CH$_3$. Accordingly, the subrate channels SUB-CH$_{11}$ and SUB-CH$_{14}$ are respectively switched to the subrate channel SUB-CH$_{24}$ of the full-rate channel FULL-CH$_2$ and the subrate channel SUB-CH$_{24}$ of the full-rate channel FULL-CH$_3$ by the subrate channel switches 103 and 302, as shown in FIG. 14. In this manner, the full-rate channel FULL-CH$_1$ is emptied and released.

FIG. 15 illustrates a third example of subrate channel reallocation and FIG. 16 shows an operation of the subrate channel switches in this example. In the present example, it is assumed that the following subrate channels have been set up: the subrate channel SUB-CH$_{11}$ of the full-rate channel FULL-CH$_1$, the subrate channel SUB-CH$_{24}$ of the full-rate channel FULL-CH$_2$, and the subrate channels SUB-CH$_{33}$ and SUB-CH$_{34}$ of the full-rate channel FULL-CH$_3$.

Under this condition, if speech of the subrate channel SUB-CH$_{11}$ of the full-rate channel FULL-CH$_1$ ends and the subrate channel is released, then the full-rate channel FULL-CH$_1$ is emptied. The total capacity of the full-rate channel FULL-CH$_1$ is greater than the total of the use capacities, USE-C$_2$+USE-C$_3$, of other full-rate channels FULL-CH$_2$ and FULL-CH$_3$. Therefore, the subrate channel SUB-CH$_{24}$ of the full-rate channel FULL-CH$_2$ and the subrate channels SUB-CH$_{33}$ and SUB-CH$_{34}$ of the full-rate channel FULL-CH$_3$ are respectively switched to the full-rate channel FULL-CH$_1$ by the subrate channel switches 103 and 302 as shown in FIG. 16. As a result, the full-rate channels FULL-CH$_2$ and FULL-CH$_3$ are respectively emptied and released.

Since certain changes may be made in the above apparatus without departing from the scope of the invention herein involved, it is therefore intended that all matter contained in the above description or shown in the accompanying drawings shall be interpreted as illustrative and not interpreted in a limiting sense.

What is claimed is:

1. A channel allocation control method in a network system comprising a plurality of full-rate channels each accommodating a plurality of subrate channels multiplexed therein, the channel allocation method comprising the steps of:

monitoring a use state of each full-rate channel, the use state of each full-rate channel including a use communication capacity of each full-rate channel, wherein the monitoring includes monitoring a use communication capacity of a first full-rate channel in which a subrate channel has been released, and empty capacities of other full-rate channels;

switching an in-use subrate channel accommodated in the first substrate channel to at least one of the other full-rate channels if a total empty capacity of at least one other full-rate channel is not smaller than the use communication capacity of the first full-rate channel; and releasing the first full-rate channel if the first full-rate channel is unused.

2. The channel allocation control method according to claim 1, wherein, if a total empty capacity of a plurality of other full-rate channels is not smaller than the use communication capacity of the first full-rate channel, a plurality of in-use subrate channels accommodated in the first full-rate channel are divided and switched among the plurality of other full-rate channels.

3. The channel allocation control method according to claim 1, wherein the network system comprises an integrated services digital network (ISDN).

4. The channel allocation method according to claim 3, wherein a set and a release of a full-rate channel is performed in accordance with a setup signal and a disconnect signal, respectively, and a set and a release of a subrate channel is performed in accordance with respective user information elements (UUIs).

5. The channel allocation control method according to claim 3, wherein the network system is a mobile communication system.

6. A channel allocation control method in a network system comprising a plurality of full-rate channels each accommodating a plurality of subrate channels multiplexed therein, the channel allocation method comprising the steps of:

monitoring a use state of each full-rate channel, the use state of each full-rate channel including a use communication capacity of each full-rate channel, switching an in-use subrate channel accommodated in a full-rate channel to another of said plurality of full-rate channels, based on the use state of each full-rate channel; and releasing the full-rate channel if the full-rate channel is unused, wherein if a first full-rate channel in which at least a subrate channel has been released is empty and if a total use communication capacity of a combination of other full-rate channels is not greater than a channel capacity of the first full-rate channel, then all subrate channels accommodated in the combination of other full-rate channels are switched to the first full-rate channel.

7. A channel allocation control system in a network system comprising a plurality of full-rate channels each accommodating a plurality of subrate channels multiplexed therein, the channel allocation control system comprising:

monitor means for monitoring a use state of each full-rate channel, the use state of each full-rate channel including a use communication capacity of each full-rate channel, wherein the monitor means monitors a use communication capacity of a first full-rate channel in which a subrate channel has been released, and empty capacities of other full-rate channels;

channel switch means for switching an in-use subrate channel accommodated in the first full-rate channel to at least one of the other full-rate channels if a total empty capacity of at least one other full-rate channel is not smaller than the use communication capacity of the first full-rate channel; and channel release means for releasing the first full-rate channel if the first full-rate channel is unused.

8. A channel allocation control system in a network system comprising a plurality of full-rate channels each accommodating a plurality of subrate channels multiplexed therein, the channel allocation control system comprising:

monitor means for monitoring a use state of each full-rate channel when a subrate channel is released;

channel switch means for switching an in-use subrate channel accommodated in a full-rate channel to another of said plurality of full-rate channels, based on the use state of each full-rate channel; and channel release means for releasing the full-rate channel if the full-rate channel is unused, wherein the network system comprises an ISDN network through which two arbitrary nodes are connected, each node comprising:

node monitor means for monitoring a use state of each full-rate channel when a subrate channel is released;

node channel switch means for switching an in-use subrate channel accommodated in a full-rate channel to another of said plurality of full-rate channels, based on the use state of each full-rate channel; and node channel release means for releasing the full-rate channel if the full-rate channel is unused.

9. The channel allocation control system according to claim 8, wherein the ISDN network comprises part of a mobile communication system, one of said two arbitrary nodes comprising a base station for communicating with a plurality of mobile stations, and the other of said two arbitrary nodes comprising a mobile communication exchange.

10. The channel allocation control system according to claim 8, wherein a set and a release of a full-rate channel is performed in accordance with a setup signal and a disconnect signal, respectively, and a set and a release of a subrate channel is performed in accordance with respective user information elements (UUIs).

11. An integrated services digital network (ISDN) communication system comprising a plurality of full-rate channels each accommodating a plurality of subrate channels multiplexed therein, comprising:

monitor means for monitoring a use communication capacity of a first full-rate channel in which a substrate channel has been released and empty capacities of other full-rate channels;

channel switch means for switching an in-use subrate channel accommodated in the first full-rate channel to at least one of the other full-rate channels if a total empty capacity of at least one other full-rate channel is not smaller than the use communication capacity of the first full-rate channel; and channel release means for releasing the first full-rate channel if the first full-rate channel is unused.

12. The ISDN communication system according to claim 11, wherein the ISDN communication system is a mobile communication system.

* * * * *